Dec. 22, 1959 E. W. BAUER 2,918,664

MAGNETIC TRANSFER CIRCUIT

Filed Jan. 10, 1957

INVENTOR.
EDWIN W. BAUER

BY
Campbell, Brumbaugh, Free & Graves his ATTORNEYS

United States Patent Office 2,918,664

Patented Dec. 22, 1959

2,918,664

MAGNETIC TRANSFER CIRCUIT

Edwin W. Bauer, Poughkeepsie, N.Y., assignor to International Business Machines Corporation, New York, N.Y., a corporation of New York Application January 10, 1957, Serial No. 633,459

9 Claims. (Cl. 340—174)

This invention relates to magnetic core memory devices and, more particularly, to a register of such devices for storing and transferring digital pulse information.

Opposite states of remanence in magnetic storage cores represent binary digital information. These states are established and controlled by current pulses applied to windings positioned on such storage cores. When a current pulse is applied to one winding to reverse the magnetic remanence state of a particular storage core, other windings associated with that core also develop an induced voltage. In other words, the input winding develops a voltage as well as the output winding so that the information tends to be transferred in both directions in a core register. The problem, therefore, is to produce a unidirectional or forward transfer of the pulse information without providing any backward transfer of this information.

Suitably connected diodes have been used in magnetic core registers to prevent undesired pulse transfers. However, these elements operate with large back voltages, have low current carrying capacity, develop heat at high speeds and require considerable power necessitating the use of laminated metallic cores or so-called tape cores with windings having a large number of turns.

Magnetic core registers avoiding the use of diodes by providing coupling cores suitably connected with storage cores are described and claimed in copending application Serial No. 528,594 of Louis A. Russell, filed August 16, 1955. While the circuit arrangements found in the Russell application do not require diodes, modified and simplified magnetic core registers using only magnetic core elements have been found desirable for various applications.

Accordingly, one of the objects of the present invention is to provide an improved magnetic core shift register wherein undesired transfer of information is prevented by magnetic coupling cores.

Another object of the invention is to provide magnetic core registers of the above character in which split-winding magnetic storage cores and magnetic coupling cores control the transfer of information between storage cores.

These and further objects of the invention are accomplished by providing a magnetic core register wherein the backward transfer of pulse information is prevented by disposing coupling circuits including magnetic cores between magnetic storage cores. Each storage core is provided with a center-tapped or "split" input winding and an output winding, with the output winding of one storage core being coupled to the input winding of the next succeeding storage core through windings on the coupling cores. A series of spaced shift pulses applied to the center tap of alternate input windings on the storage cores advances the information from one storage core to the next succeeding storage core.

Still further objects and advantages of the present invention will become apparent to those skilled in the art to which it pertains from the following detailed description of the present preferred embodiment thereof described with respect to the accompanying drawings, in which.

Figure 1:
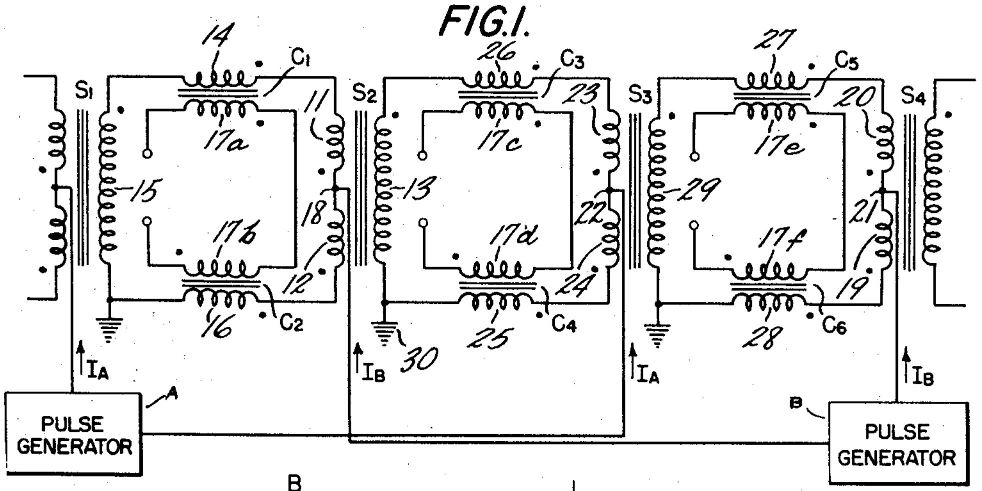
Figure 1 is a circuit diagram of a magnetic core shift register comprising one embodiment of the present invention.

Referring now to a typical embodiment of the invention illustrated in Figure 1 of the drawings, each stage of a shift register includes a magnetic storage core S and two magnetic coupling cores C, particular elements being identified by appropriate suffixes. A magnetic storage core $S_2$, which is typical of all the storage cores, is provided with a split input winding 11—12 and an output winding 13. Coupling between successive stages is provided by a series circuit, one of which, for example, may be traced through the split input winding 11—12, a winding 14 on a magnetic coupling core $C_1$, and output winding 15 on a storage core $S_1$ of the preceding stage and a winding 16 on a magnetic coupling core $C_2$. Control windings **17*a*—17*f*** receive spaced reset pulses, a constant D.C. current, or both to bias each of the magnetic coupling cores $C_1$—$C_6$ in the "zero" remanence state, such reset current slowly returning any switched coupling cores to the "zero" remanence state after each cycle of operation.

To assist in an understanding of the invention, a dot marking is placed adjacent one end of each winding to indicate relative polarity such that an electric current flowing into a dot-marked terminal tends to switch the associated magnetic core to a binary "zero" state of remanence. Conversely, if an electric current flows into an unmarked terminal, the magnetic force developed thereby tends to switch the associated magnetic core to a binary "one" state of remanence.

Each of the storage and coupling cores will present a high or a low impedance to the flow of electric current depending on the direction of the current and on the polarity, or remanence state, of a particular core. For example, if an electric current is flowing into the unmarked terminal of a winding thereby tending to establish a "one" state of magnetic remanence therein, but the core was originally magnetized in the opposite remanence state, then in reversing the state of magnetic remanence of the core a high impedance will be presented to the current flow. On the other hand, if an electric current is flowing into a dot-marked terminal of a winding tending to establish a "zero" state of magnetic remanence therein and the core is already in the "zero" state, then a low impedance is presented to the current flow.

The split input windings 11—12 and 19—20 of the magnetic storage cores $S_2$ and $S_4$, respectively, are connected such that the dot-marked terminal of the windings 11 and 20 are connected to the unmarked terminal of the other input windings 12 and 19, respectively. A sequence of timed current pulses $I_B$ is delivered by a pulse generator B to these input windings at their points of intersection 18 and 21, respectively. The split input windings of the other storage cores $S_1$ and $S_3$ are connected in like manner and receive a sequence of timed current pulses $I_A$ from a pulse generator A.

The pulse generators A and B which supply the timed sequence of the shift pulses may be, for example, of the electron tube type, magnetic core drivers or transistor driven pulse transformers of the type described in copending application Serial No. 511,082 of J. B. Mackay et al. filed May 25, 1955. Other suitable types of known pulse generators may also be used.

Figure 2:
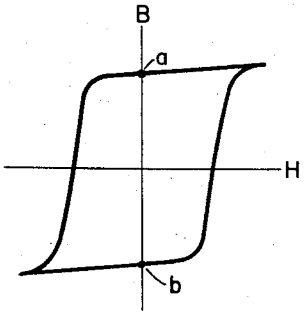
Figure 2 illustrates a square loop hysteresis characteristic which is representative of magnetic materials having a coercive force threshold as required for the storage cores of the present invention.

The hysteresis loop illustrated in Figure 2 is representative of a typical characteristic for a square-loop ferrite core composition, with the vertical axis representing magnetic flux density B and the horizontal axis representing the applied field strength H. The residual flux density ($B_r$) is a large portion of the saturation flux density ($B_s$) and the curve has substantially square knees which is indicative of a well defined threshold coercive force. When the magnetic storage cores are magnetized in one direction, as for example at point *a*, the binary "one" state is designated arbitrarily thereby and when the magnetic storage cores are magnetized in the opposite direction, as for example at point *b*, the binary "zero" state is represented arbitrarily thereby. Electric current flowing into a dot-marked terminal on any winding reads (stores) "zero" into the magnetic core associated therewith.

In the inventive magnetic core registers, the characteristics of the storage cores S and their associated windings must be related in a predetermined manner to the coupling cores C and their associated windings. This relation must be such that a particular curent flow through a series circuit including windings on both cores S and C, just sufficient to switch the coupling core C, will not switch the storage core S. To provide for the foregoing, with cores of like geometry for example, either the threshold coercive forces required to switch the storage cores S must be greater than that required to switch the coupling cores C or the windings on the coupling cores C must provide a magnetomotive force (M.M.F.) exceeding the M.M.F. in the storage cores. Of course, other combinations of these factors, geometry and core material will also provide the desired characteristics.

It will be appreciated from the above that the storage cores are always formed of square loop ferromagnetic material. However, while the coupling cores C may also exhibit a rectangular hysteresis characteristic, they need only be capable of attaining opposite stable remanence states. This will be understood from the following discussion of the operation of the magnetic core register of Figure 1.

In describing a typical operation of the shift register, it will be assumed that the storage core $S_2$ is storing a "one" and that all of the other storage cores and all of the coupling cores are in the "zero" remanence state. To transfer the "one" in the storage core $S_2$ to the storage core $S_3$, a shift pulse $I_A$ is delivered to the mid-point 22 between the two input windings 23 and 24 on the storage core $S_3$. As a result, current flows to ground 30 through two branch circuits, the first of which includes the windings 23, 26 and 13 while the second comprises the windings 24 and 25.

The winding 25 on the coupling core $C_4$ presents a low impedance to the current flowing in this first branch because the current enters its dotted terminal, this core already being in a "zero" remanence state. However, current flow is greatly reduced in the second branch, in spite of the low impedance of the winding 26 on the coupling core $C_3$, because of the high impedance presented by the output winding 13 on the storage core $S_2$. Such high impedance is due to the changing magnetic flux in the core $S_2$ as the "one" is read out and a "zero" remanence state set up therein.

Examining the effect on the preceding loop of transferring a "one" from the core $S_2$ to the core $S_3$, as the magnetic storage core $S_2$ is changed to a "zero" remanence state, a voltage is induced in the split input windings 11—12 which are associated therewith. As there is no $I_B$ shift pulse applied to the terminal 18 at this instant, the current in both the input windings 11 and 12 of the storage core $S_2$ flows in a clockwise direction from the winding 14 on the coupling core $C_1$ toward the winding 16 on the coupling core $C_2$, the winding 16 presenting a low impedance to this current flow because it is in the "zero" remanence state. Such induced current flow in the loop also flows through the winding 15 on the core $S_1$ tending to shift it to its "one" state. Such unwanted switching of the core $S_1$ is precluded by its high impedance in series with an additional high impedance supplied by the winding 14. While the current flow is limited to a value below the threshold for the core $S_1$, it is sufficient to switch the magnetic state of the coupling core $C_1$ from "zero" to "one." As discussed above, the characteristics of the cores and their associated windings are selected so that a value of current just sufficient to switch the coupling core $C_1$ will be insufficient to switch the storage core $S_1$.

As a result of the high impedance of the storage core $S_2$ during the read out of the "one" stored therein, the portion of the current that passes through the winding 23 on the storage core $S_3$ is much smaller than that passing through winding 24 (about a 1 to 4 ratio). Therefore, the unmarked terminal of the winding 24 receives the larger current flow to switch the magnetic remanence state of the storage core $S_3$ from "zero" to "one."

Considering the effect on the succeeding loop of transferring a "one" from the core $S_2$ to the core $S_3$, the change in the magnetic state of the storage core $S_3$ induces a voltage in the output winding 29 causing counterclockwise current flow through the series-connected windings 28, 19, 20 and 27 on the cores $C_6$, $S_4$ and $C_5$, respectively. Since this current passes into the unmarked terminal on the winding 28 on the coupling core $C_6$, the magnetic state of the coupling core $C_6$ will be changed from "zero" to "one." In so changing, a high impedance is presented to limit the current flow.

The current flowing from the winding 29 passes into the dotted terminals of the split input windings 19 and 20 and since their associated core $S_4$ is storing a "zero," no change in its magnetic state results. Similarly, the winding 27 on the coupling core $C_5$ will be unaffected by this current.

Thus, the "one" has been read out of the storage core $S_2$ and into the storage core $S_3$. However, the coupling cores $C_1$ and $C_6$ have been shifted to the opposite remanence state and must be reset before the application of an $I_B$ shift pulse.

Such resetting of the coupling cores may be accomplished by either a constant D.-C. bias, reset pulses, or a combination of the two. To prevent switching in the storage cores S during such resetting, the coupling cores C are switched at a sufficiently slow rate so that the voltage appearing across their output windings causes a flow of current less than $I_o/n$ where $I_o$ is the threshold current and $n$ the number of turns of the storage core windings.

It will be obvious that so long as the coupling core material has a high $B_r/B_s$ ratio, it need not be rectangular. Furthermore, with either type of core material, the coupling core C may be reset by a single continuous reset current bias as well as by reset pulses.

The time required for resetting the coupling cores C to a zero state is the primary factor limiting the operating cycle time. If desired, the magnitude of the threshold coercive forces in the storage cores S may be increased to permit higher values of current to flow ineffectively therethrough so that the resetting time may be reduced.

Figure 3:
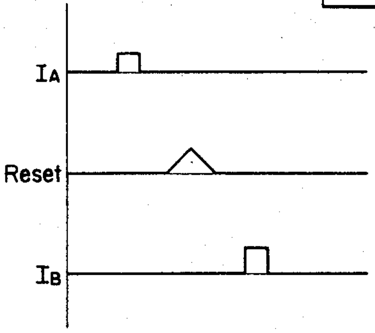
Figure 3 illustrates a series of shift and reset pulses for one operating cycle of the present invention.

Referring to Figure 3, the triangular reset pulse shown is applied to the windings 17*a*—17*f*, either individually or simultaneously, the pulse rising and falling at a slow rate to restore the coupling cores $C_1$ and $C_6$ to their original remanence state without inducing voltages and currents in the secondary winding 14 and 28 sufficiently high to provide M.M.F.'s exceeding the threshold coercive force of the storage cores S. Conventional rectangular pulses may also be used if their value is such that the inductance in the circuit maintains the change of flux below the threshold value. A constant D.-C. bias current must also be so limited in amplitude.

After the coupling cores have been reset to their original remanence state, the $I_B$ shift pulse is applied to transfer the "one" now in the storage core $S_3$ to the next succeeding storage core $S_4$ in a manner similar to that just described.

If the storage core $S_2$ were storing a "zero" originally and a shift current applied as described above, impedances in the two branches are such that the current through the windings 23 and 24 would be about equally divided and the resultant opposing M.M.F.'s would not switch the core $S_3$.

The invention has been shown and described by way of example, and many modifications and variations may be made therein by those skilled in the art to which it pertains without departing from the spirit and scope of the invention.

I claim:

1. A magnetic core register comprising a series of magnetic storage cores having a substantially square hysteresis characteristic and each carrying a split input winding tapped at its intersection and an output winding, a plurality of magnetic coupling cores each carrying an input winding adapted to be energized by resetting current and an output winding, the coupling cores being capable of being switched without switching the storage cores, means including two of the coupling core output windings respectively connecting the ends of each of the storage core output windings to the ends of the succeeding split input winding, said resister being adapted to receive timed shift pulses between each of the split winding taps and one end of the preceding storage core output winding.

2. A magnetic core register as defined in claim 1 wherein the resetting current flows in response to resetting pulses supplied to said coupling core input windings.

3. A magnetic core register as defined in claim 1 wherein the resetting current flows in response to a D.-C. bias source applied to said coupling core input windings.

4. A magnetic core register comprising a series of magnetic storage cores having a substantially square hysteresis characteristic and capable of assuming alternate stable magnetic states to represent binary information and having a coercive force threshold, each of said storage cores carrying a split input winding tapped at its intersection and an output winding, a plurality of magnetic coupling cores capable of attaining alternate stable magnetic states, the coupling cores being capable of being switched without switching the storage cores, an input winding adapted to be energized by resetting current and an output winding on each of said coupling cores, means including two of the coupling core output windings respectively connecting the ends of each of the storage core output windings to the ends of the succeeding split input winding, said register being adapted to receive timed shift pulses between each of the split winding taps and one end of the preceding storage core output winding to transfer binary information along the series of cores, one of the coupling core output windings presenting a high impedance to induced pulses in a circuit including the preceding storage core split winding and the next preceding storage core output winding.

5. A magnetic core register as defined in claim 4 wherein the resetting current flows in response to resetting pulses supplied to said coupling core input windings.

6. A magnetic core register as defined in claim 4 wherein the resetting current flows in response to a D.-C. bias source applied to said coupling core input windings.

7. A magnetic core register comprising a series of magnetic storage cores having a substantially square hysteresis characteristic and capable of assuming alternate stable magnetic states to represent binary information and having a coercive force threshold, each of said storage cores carrying a split input winding tapped at its intersection and an output winding, a plurality of magnetic coupling cores capable of attaining alternate stable magnetic states, the coupling cores being capable of being switched without switching the storage cores, an input winding adapted to be energized by resetting current and an output winding on each of the coupling cores, means including two of the coupling core output windings respectively connecting the ends of each of the storage core output windings to the ends of the succeeding split input winding, said register being adapted to receive timed shift pulses between each of the split winding taps and one end of the preceding storage core output winding to transfer binary information along the series of cores, one of the coupling core output windings presenting a high impedance to induced pulses in a circuit including the preceding storage core split winding and the next preceding storage core output winding, another of the coupling core output windings presenting a high impedance to induced pulses in a circuit including the output winding carried on the storage core with said one split winding and the succeeding storage core split winding.

8. A magnetic core register as defined in claim 7 wherein the resetting current flows in response to resetting pulses supplied to said coupling core input windings.

9. A magnetic core register as defined in claim 7 wherein the resetting current flows in response to a D.-C. bias source applied to said coupling core input windings.

References Cited in the file of this patent

UNITED STATES PATENTS

| | | |
|---|---|---|
| 2,781,503 | Saunders | Feb. 12, 1957 |
| 2,832,065 | Disson et al. | Apr. 22, 1958 |

OTHER REFERENCES

Publication I: An article entitled, Magnetic Core Circuits for Digital Data-Processing Systems" by D. Loev et al., published in "Proceedings of the I.R.E.," vol. 44, issue 2, pp. 154–162, February 1956.